(12) United States Patent
Gastineau et al.

(10) Patent No.: US 7,833,651 B2
(45) Date of Patent: Nov. 16, 2010

(54) BATTERY HOLDER

(75) Inventors: Douglas Reid Gastineau, Costa Mesa, CA (US); Michael Santos Finena, Lake Forrest, CA (US); Robbie Lee Gray, Roanoke, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 651 days.

(21) Appl. No.: 11/879,129

(22) Filed: Jul. 16, 2007

(65) Prior Publication Data

US 2009/0023055 A1    Jan. 22, 2009

(51) Int. Cl.
*H01M 2/10* (2006.01)
(52) U.S. Cl. .......................................... 429/96; 429/100
(58) Field of Classification Search .................... 429/96, 429/99, 100
See application file for complete search history.

(56) References Cited

U.S. PATENT DOCUMENTS

| | | | |
|---|---|---|---|
| 2,983,778 A | 5/1961 | Munse | |
| 3,181,974 A | 5/1965 | Barbera | |
| 4,213,079 A | 7/1980 | Mullersman | |
| 4,229,686 A | 10/1980 | Mullersman et al. | |
| 4,608,528 A | 8/1986 | Stillwell | |
| 4,977,042 A | 12/1990 | Chiyajo et al. | |
| 5,116,699 A * | 5/1992 | Miyajima | 429/100 |
| 5,431,575 A * | 7/1995 | Engira | 429/100 X |
| 5,521,022 A | 5/1996 | Petzl | |
| D408,351 S | 4/1999 | Shim | |
| D409,559 S | 5/1999 | Shim | |
| D409,560 S | 5/1999 | Shim | |
| 5,922,489 A | 7/1999 | Adachi | |
| 6,186,824 B1 | 2/2001 | Lee | |
| 6,440,601 B1 | 8/2002 | Aoi et al. | |
| 6,511,770 B2 * | 1/2003 | Chang | 429/100 |
| 6,549,423 B1 | 4/2003 | Brodnick | |
| D483,722 S | 12/2003 | Bailey | |
| D488,443 S | 4/2004 | Bailey | |
| 7,033,695 B2 | 4/2006 | Sawachi | |
| 2003/0118875 A1 | 6/2003 | Wu | |

* cited by examiner

*Primary Examiner*—Stephen J. Kalafut
(74) *Attorney, Agent, or Firm*—Peter Van Winkle

(57) ABSTRACT

A battery holder frame (12) that facilitates the removal of a fully installed battery (30) (electrical cell). The frame has top (20), bottom (22), opposite side (24, 26), and back walls (28) that form a cavity (14) that receives a battery by moving the battery rearward into the cavity until the battery abuts the back wall. The back wall upper portion has a bottom edge (66) and leaves an opening (62) below the bottom edge through which the bottom of the battery can move rearward out of the cavity. To remove a fully installed battery, the battery bottom is pushed rearward to cause the battery to pivot so its upper portion (152) moves forward out of the cavity and can be grasped to pull the battery out of the cavity.

5 Claims, 2 Drawing Sheets

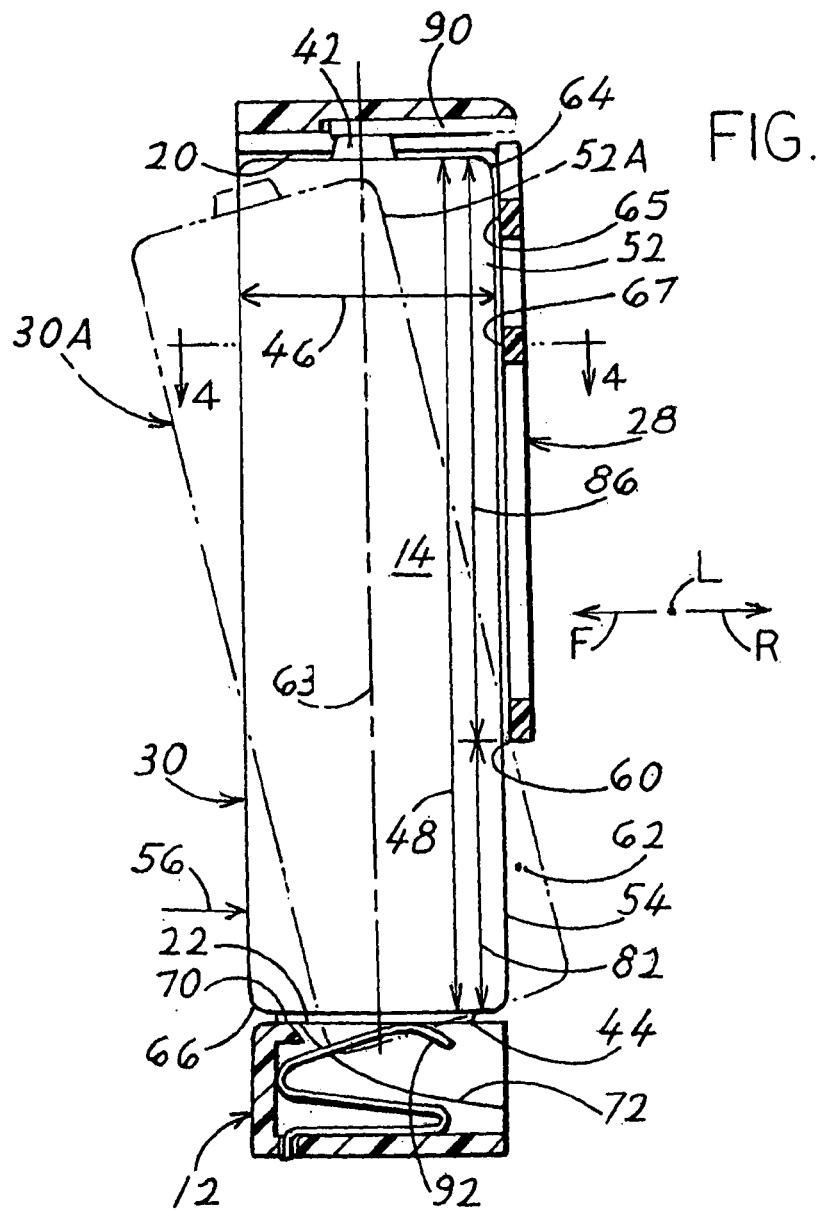
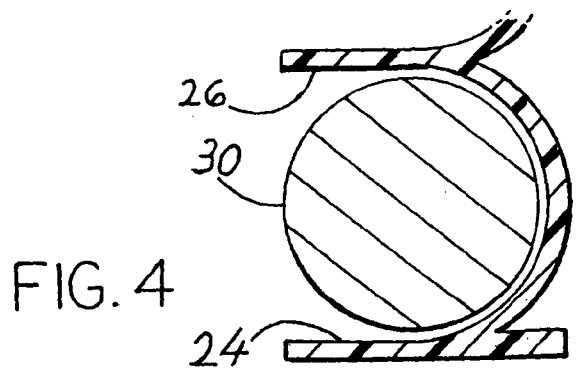
FIG. 3
FIG. 4

BATTERY HOLDER

BACKGROUND OF THE INVENTION

A common type of battery (electric cell) for consumer electronic equipment is cylindrical, with top and bottom battery terminals separated by more than the battery diameter. Perhaps the most common of this type of battery is the AA battery which has a diameter of 14 millimeters, a body length of 48 mm, and a length between the ends of its opposite terminals of 50 mm. A battery holder usually includes a molded plastic frame with a top wall, a bottom wall, opposite side walls, and a back wall, and with electric contacts at the top and bottom walls. A battery is installed by moving it rearward into the cavity until the battery abuts the frame back wall.

It is often difficult to remove a battery when it has to be replaced. A person may attempt to grasp opposite sides of the battery that are separated by the battery diameter, but the side walls of the battery holder are in the way. People often resort to the use of a screwdriver blade to try to pry the battery loose, although there is often little space to receive the blade. A battery holder frame that facilitated battery removal would be of value.

SUMMARY OF THE INVENTION

In accordance with one embodiment of the present invention, applicant provides a battery holder for one or more batteries, which facilitates the removal of a battery from the holder frame. The holder includes a frame with a compartment for at least one battery, the frame including a top wall, a bottom wall, opposite side walls, and a back wall, that form a battery-holding cavity between them. A battery is installed by moving it rearward through an open front end of the cavity until the battery abuts the back wall. The battery terminals engage electric contacts at the top and bottom walls of the holder in the fully installed position of the battery.

The back wall has a bottom edge that leaves an opening below the bottom edge through which a lower portion of the battery can pass backward out of the cavity. A person can remove a fully installed battery by pushing a bottom portion of the battery backward so it moves backward a small distance out of the cavity. This results in the battery pivoting on the back wall bottom edge, so a battery top portion moves forward out of the cavity. With the battery top portion projecting forward out of the cavity, a person can grasp opposite sides of the battery to pull the entire battery out of the frame.

The bottom wall of the frame has a downward-backward inclined bottom wall section. As the battery pivots, the bottom of the battery can slide along a downward incline along the inclined bottom wall section to prevent the top of the battery from jamming against the top wall. The bottom edge of the back wall is vertically aligned with the rest of the upper section of the back wall, so the installed battery lies against a tall back wall section. The bottom edge preferably lies about one-third of the battery height, above the back wall bottom wall, to cause the installed battery to lie vertical and still allow the battery to pivot on the back wall.

The novel features of the invention are set forth with particularity in the appended claims. The invention will be best understood from the following description when read in conjunction with the accompanying drawings.

BRIEF DESCRIPTION OF THE DRAWINGS

FIG. 3 is a partial sectional side elevation view of the frame of FIG. 2 with electrical contacts, showing in solid lines a fully installed battery, and showing in phantom lines a battery that has been tilted in preparation for its removal.

FIG. 4 is a view taken on line 4-4 of FIG. 3.

DESCRIPTION OF THE PREFERRED EMBODIMENT

Figure 1:
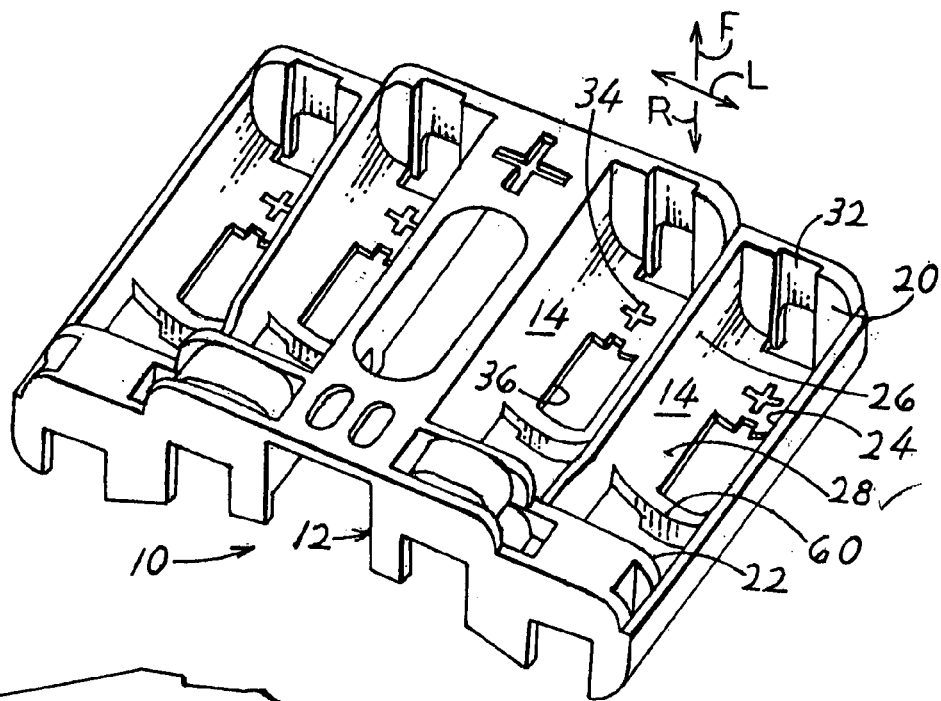
FIG. 1 is a front isometric view of a frame of a four-cell battery holder of the present invention.

FIG. 1 shows a battery holder 10 that is designed to hold four AA batteries. Each battery (also called "power cell") is often described as having upper and lower terminals, which are the electrically positive and negative terminals, even though the battery may be used in any orientation. In the following description applicant will describe the battery holder as having top and bottom parts corresponding to the top and bottom battery parts.

The battery holder includes a plastic molded frame 12 that forms four battery cavities 14 that each receives a battery by moving the battery rearward R into the cavity. For each cavity the frame has top and bottom walls 20, 22, laterally L opposite side walls 24, 26, and a back wall 28. Each top wall has an upward recess 32. The back wall 28 is curved as part of a cylinder corresponding to the curvature of the battery although this is not necessary. The back wall 28 has holes 34, 36, one 34 showing that the battery positive terminal "+" is uppermost, and the other one 36 showing the orientation of the battery with its projection at the top. The battery is inserted by moving it backward, or rearward R, until it abuts the back wall 28 and lies against it.

FIG. 3 shows, in solid lines, a fully installed battery 30 that lies substantially facewise against the curved back wall 28. The battery 30 is of the M type, which has top and bottom terminal 42, 44, has a diameter 46 of 14 millimeter, has a height 48 of 48 mm when not including the terminals, and has a height of 50 mm when including the terminals. The battery has upper and lower portions 52, 54. The bottom terminal 44 can be said to be the battery bottom.

The back wall has a bottom edge 60 at the front end of the black wall 28. The bottom edge lies at the bottom of the back wall though not at the bottom of the cavity. The frame 12 has an opening 62 extending down from the bottom edge 60 to the height of the bottom wall 22 of the cavity. The opening 62 is wide enough that the battery lower portion can move backward R through the opening 62. This requires an opening with a bottom of at least the battery diameter, with the opening lying directly behind the cavity axis 63. The back wall has upper back wall surfaces 65, 67, and the bottom edge 60 is vertically aligned with at least one of the surfaces 65, 67 to hold the battery vertical when fully installed.

To remove the battery 30 of FIG. 3 from the frame 12, a person first pushes backward R against the battery lower portion 54, as indicated by arrow 56. This force moves the battery lower portion a short distance backward through the opening 62 and out of the cavity 14, to the position 30A and slightly beyond. While the battery lower portion moves rearward out of the opening 62, the battery pivots about the back wall bottom edge 60, causing the battery upper portion 52 to move forward F out of the cavity to the position 52A. Further rearward movement of the battery bottom portion moves the battery upper portion far enough forward that a person can grasp laterally L opposite sides of the battery and remove it from the frame.

Figure 2:
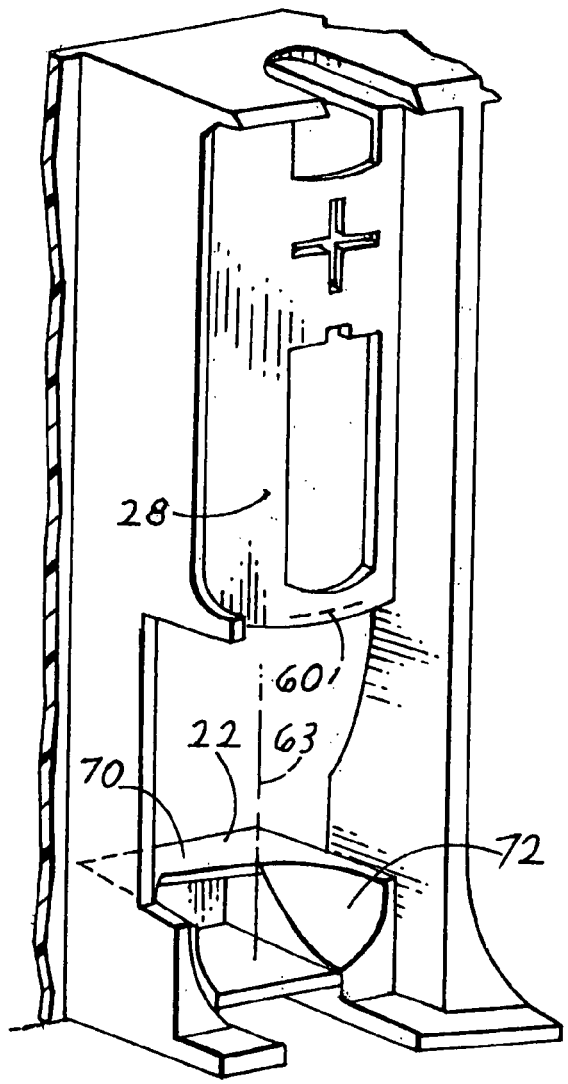
FIG. 2 is a rear isometric view of a portion of the frame of FIG. 1 for holding a single battery.

When the battery tilts, its opposite corners 64, 66 could jam between the frame top and bottom walls 20, 22. To prevent this, applicant forms the bottom wall 22, as indicated in FIG. 2, with a flat horizontal section 70 and with a rearwardly-downward inclined section 72 (which has parts on opposite sides of the axis 63). The bottom of the fully installed battery lies stably on the horizontal section 70. After the battery bottom has moved a short distance rearward, its bottom moves down as it moves further rearward, which avoids jamming. The inclined section 72 actually includes laterally opposite sides that are inclined to be lower at locations closer to the axis 63 of the cavity, to urge the battery bottom away from the sides of the horizontal bottom section 70.

The bottom edge 60 (FIG. 3) of the back wall lies a distance 82 above the horizontal bottom wall section 70, to leave the opening 62 of a height 82. If there were no inclined bottom wall section 72 then the height 82 would have to be large to allow the battery upper corner 64 to begin forward movement during pivoting, without jamming against the upper cavity wall. However, because of the inclined bottom wall section 72, applicant can place the back wall bottom edge 60 below a point that is half way between the cavity top and bottom walls 20, 22. Applicant prefers to place the bottom edge 60 about one-third of the distance 48 between the top and bottom walls 20, 22, above the bottom wall. That is, the height 82 of the opening above the bottom wall, is a distance that is between one-sixth and two thirds of the distance 48 and preferably between one-quarter and one half the distance 48. A considerable distance 86 of bottom edge 60 below the top wall 20 is desirable to facilitate proper orientation of the battery when it is pushed forward against the back wall to its fully installed position. The small distance 82 causes large battery pivoting for a given rearward movement of the battery lower portion 54.

FIG. 3 shows positive and negative battery holder contacts 90, 92 that engage the battery terminals 42, 44. The negative contact 92 is highly elastic and its upper end can deflect to the inclined bottom wall section 72.

Although terms such as "top", "bottom", "horizontal", etc. have been used to describe the relative positions of the parts, it should be noted that the invention can be used in any orientation.

Thus, the invention provides a frame with walls that form at least one battery-holding cavity with top, bottom, opposite side, and back walls, which facilitates the removal of a fully installed battery. The back wall has a bottom edge and has a back wall opening that is at least about as wide as the battery extending below the bottom edge, so the battery lower portion can move backward into the opening to pivot the battery during battery removal. The back wall bottom edge preferably lies above the cavity bottom wall by about one third the vertical distance between the top and bottom walls. The cavity bottom wall has a horizontal section that supports the battery in its fully installed position, and has an inclined section that allows the battery to move down as its bottom portion moves rearward during pivoting. The invention can be applied to battery holders that hold a variety of cylindrical batteries, including AAA, C and D batteries.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A frame that has walls forming a battery cavity for holding and facilitating removal of a cylindrical battery of predetermined height and diameter, said cavity having cavity walls including top and bottom cavity walls, opposite cavity side walls, and a cavity back wall, said cavity walls leaving an open front through which said battery moves rearward into said cavity until the battery lies against the back wall and is fully installed, wherein:

said cavity back wall has a bottom edge and leaves an opening below said bottom edge through which a lower portion of said installed battery can pass backward out of said battery cavity to pivot said installed battery on said back wall bottom edge and move the top of the installed battery forward out of the cavity;

said back wall bottom edge lies a distance (82) above said cavity bottom wall that is greater than said battery diameter (46), to allow the battery to move backward through said opening.

2. The wall forming a battery cavity described in claim 1 wherein:

said cavity bottom wall includes a horizontal bottom wall section (70) that is positioned to directly engage a battery bottom of a fully installed battery, and said cavity bottom wall includes a rigid rearward-downward inclined bottom wall section (72) positioned to guide downward movement of said battery bottom as said battery bottom passes backward out of said battery cavity.

3. The wall forming a battery cavity described in claim 2 wherein:

an electrical contact (92) lying at a bottom of said cavity, said electrical contact having a resilient upper end that is elastic so said electrical contact upper end can deflect downward to the height of said rearward-downward inclined bottom wall section (72) when the battery is pivoted on said back wall bottom edge.

4. A battery frame with at least one cavity for holding and facilitating removal of a battery of predetermined height and diameter which has an electrically positive top end forming a conductive dimple and a bottom end with an electrically negative conductive plate, said frame including top and bottom cavity walls, opposite cavity sides, and a cavity back wall, said cavity walls leaving a battery cavity with an open front through which said battery moves into said battery cavity until the battery lies against the back wall, wherein;

said cavity back wall has an upper back wall section that blocks the back of the battery cavity and that extends down along only a portion of the battery height below said cavity top wall and that has a back wall bottom edge, and said cavity forms an opening rearward of said battery cavity below said back edge to pass the bottom of the battery rearward into said opening, said back wall upper part and said back wall bottom edge being vertically aligned to hold the installed battery vertical, to thereby allow battery removal by backward movement of only a bottom portion of the battery so the battery tilts about said bottom edge to facilitate grasping a battery upper portion;

said bottom compartment wall has a horizontal section, and also has a rearward-downward inclined section that directly contacts the battery lower end and over which the battery lower end rides when the bottom portion of the fully installed battery moves backward.

5. A frame having walls forming a battery cavity for holding and facilitating removal of a cylindrical battery of predetermined height and diameter which has a battery lower end, said cavity having cavity walls including top and bottom cavity walls, opposite cavity side walls, and a cavity back wall, said cavity walls leaving an open front through which said battery moves rearward into said cavity until the battery lies against the back wall and is fully installed, wherein:
said back wall has means for allowing the fully installed battery to be tilted so a battery lower portion moves rearward while a battery upper portion moves forward until it can be grasped to pull out the battery from the cavity;

said cavity bottom wall includes a rigid rearward-downward inclined bottom wall section (72) positioned to directly engage said battery lower end for guiding downward movement of a battery bottom as said battery tilts.

\* \* \* \* \*

UNITED STATES PATENT AND TRADEMARK OFFICE
CERTIFICATE OF CORRECTION

PATENT NO. : 7,833,651 B2  Page 1 of 1
APPLICATION NO. : 11/879129
DATED : November 16, 2010
INVENTOR(S) : Douglas Reid Gastineau, Michael Santos Finona and Robbie Lee Gray It is certified that error appears in the above-identified patent and that said Letters Patent is hereby corrected as shown below:

Title page, item [75] inventor:
Change the second inventor's last name from "Finena" to -- Finona --.

Signed and Sealed this
Eighteenth Day of October, 2011

David J. Kappos
*Director of the United States Patent and Trademark Office*